(12) United States Patent
Kirwan et al.

(10) Patent No.: US 6,178,949 B1
(45) Date of Patent: Jan. 30, 2001

(54) ENGINE CONTROL HAVING FUEL VOLATILITY COMPENSATION

(75) Inventors: John E. Kirwan; Frederic Anton Matekunas, both of Troy; Scott Willis Jorgensen, Bloomfield Township, Oakland County; Chen-Fang Chang, Troy, all of MI (US)

(73) Assignee: General Motors Corporation, Detroit, MI (US)

(*) Notice: Under 35 U.S.C. 154(b), the term of this patent shall be extended for 0 days.

(21) Appl. No.: 09/411,273

(22) Filed: Oct. 4, 1999

(51) Int. Cl.[7] ....................................... F02M 7/00
(52) U.S. Cl. ..................... 123/435; 123/486; 123/406.22
(58) Field of Search ................................ 123/435, 486, 123/406.47, 406.22

(56) References Cited

U.S. PATENT DOCUMENTS

| | | |
|---|---|---|
| 4,621,603 | 11/1986 | Matekunas .......................... 123/425 |
| 4,624,229 | 11/1986 | Matekunas .......................... 123/425 |
| 5,682,856 * | 11/1997 | Tomisawa et al. ............. 123/406.22 |
| 5,868,117 * | 2/1999 | Moote et al. ........................ 123/486 |
| 6,062,193 * | 5/2000 | Gatellier ............................... 123/435 |
| 6,079,396 * | 6/2000 | Ament et al. ........................ 123/491 |

* cited by examiner

*Primary Examiner*—John Kwon
(74) *Attorney, Agent, or Firm*—George A. Grove

(57) ABSTRACT

An improved engine control in which the fuel volatility is detected based on a measure of the fired-to-motored cylinder pressure ratio, and used to trim fuel and spark timing controls during engine warm-up and transient fueling periods. In a first embodiment, a matrix of empirically determined pressure ratio values that occur with fuels of differing volatility is stored and compared to the measured pressure ratio to identify the closest stored pressure ratio, and the fuel volatility is determined based on the fuel volatility associated with the identified pressure ratio. In a second embodiment, the actual fuel vapor-to-air equivalence ratio is computed based on the measured pressure ratio, and the fuel volatility is determined based on the deviation between the actual ratio and the desired fuel vapor-to-air equivalence ratio.

6 Claims, 4 Drawing Sheets

ENGINE CONTROL HAVING FUEL VOLATILITY COMPENSATION

TECHNICAL FIELD

The present invention relates in general to an engine fuel and spark control, and more specifically to a control that is compensated for variations in fuel volatility during cold starts and fueling transients.

BACKGROUND OF THE INVENTION

Current state-of-the-art engine controls rely almost exclusively on exhaust gas sensing to maintain the engine air-fuel ratio at a value that minimizes exhaust emissions. However, such sensors typically require heating for a significant period before the sensor is useful for control following a cold start. For this reason, engine spark timing and fueling during cranking and warm-up is generally performed based on an open-loop calibration. For a given amount of fuel delivered to the intake manifold, the air-fuel ratio delivered to the cylinder varies considerably for fuels of different volatility. The fuel in the cylinder comes in part from vaporized fuel from the current injection event and in part from fuel vaporized from the port walls wetted by previous injections. The rate at which both these components vaporize depends not only on temperature and pressure, but also on the fuel volatility, which may vary considerably from tank to tank.

The above-described dependence on fuel volatility is illustrated in FIG. 1A, where the solid and broken traces represent the fuel vapor-to-air equivalence ratio $\phi_v$ as a function of time, as measured in the engine exhaust stream during a cold start test. The solid trace depicts the ratio $\phi_v$ for a fuel having a relatively high volatility, while the broken trace depicts the ratio $\phi_v$ for a fuel having a relatively low volatility. As seen in the graph, the ratio $\phi_v$ is roughly 20% richer with the high volatility fuel than with the low volatility fuel. FIG. 1B shows the indicated mean effective pressure (IMEP) for the two fuels; again, the solid trace corresponding to the high volatility fuel, and the broken trace corresponding to the low volatility fuel. The IMEP parameter, a measure of the work produced, is significantly lower and more variable for the low volatility fuel than for the high volatility fuel. This is a result of the low volatility fuel yielding a leaner mixture, which for a given spark timing, burns later during the engine cycle than the richer mixture. For the condition depicted, these later burning cycles release heat further after top-dead-center for the piston, resulting in less useful work being produced with nominal spark advance settings.

The uncertainty in $\phi_v$ delivered to the cylinder and the appropriate spark timing forces design engineers to enrich the cold calibration to insure that operating with low volatility fuel will not result in driveability problems. This enrichment to compensate for low volatility fuels causes $\phi_v$ to be richer-than-optimum with high volatility fuel, resulting in higher hydrocarbon emissions than if the appropriate calibration for that fuel was used. Similar phenomena occur, although to a lesser degree, during fueling transients. Thus, it is apparent that differences in fuel volatility adversely affect both emissions and performance with conventional control strategies.

Accordingly, what is needed is a method for detecting fuel volatility in order to deliver fuel more accurately, for improved emissions and driveability.

SUMMARY OF THE INVENTION

The present invention is directed to an improved engine control in which in-cylinder air-fuel ratio is detected based on a measure of the fired-to-motored cylinder pressure ratio. The detected air-fuel ratio is used to infer the fuel volatility and to appropriately trim fuel and spark timing during engine warm-up and transient fueling periods. In a first embodiment, a matrix of empirically determined pressure ratio values that occur with fuels of differing volatility are stored and compared to the measured pressure ratio determined from pressure sensor signal samples to identify the closest stored pressure ratio. The fuel volatility is determined based on the fuel volatility associated with the identified pressure ratio. In a second embodiment, the actual fuel vapor-to-air equivalence ratio is computed based on the measured pressure ratio, and the fuel volatility is determined based on the deviation between the actual ratio and the desired fuel vapor-to-air equivalence ratio.

BRIEF DESCRIPTION OF THE DRAWINGS

FIG. 4 is a main flow diagram;

FIG. 5 is an interrupt service routine for detecting fuel volatility and compensating the engine control parameters; and FIGS. 6–7 detail alternate implementations of the fuel volatility detection step of the flow diagram of FIG. 4.

DESCRIPTION OF THE PREFERRED EMBODIMENT

Figure 2:
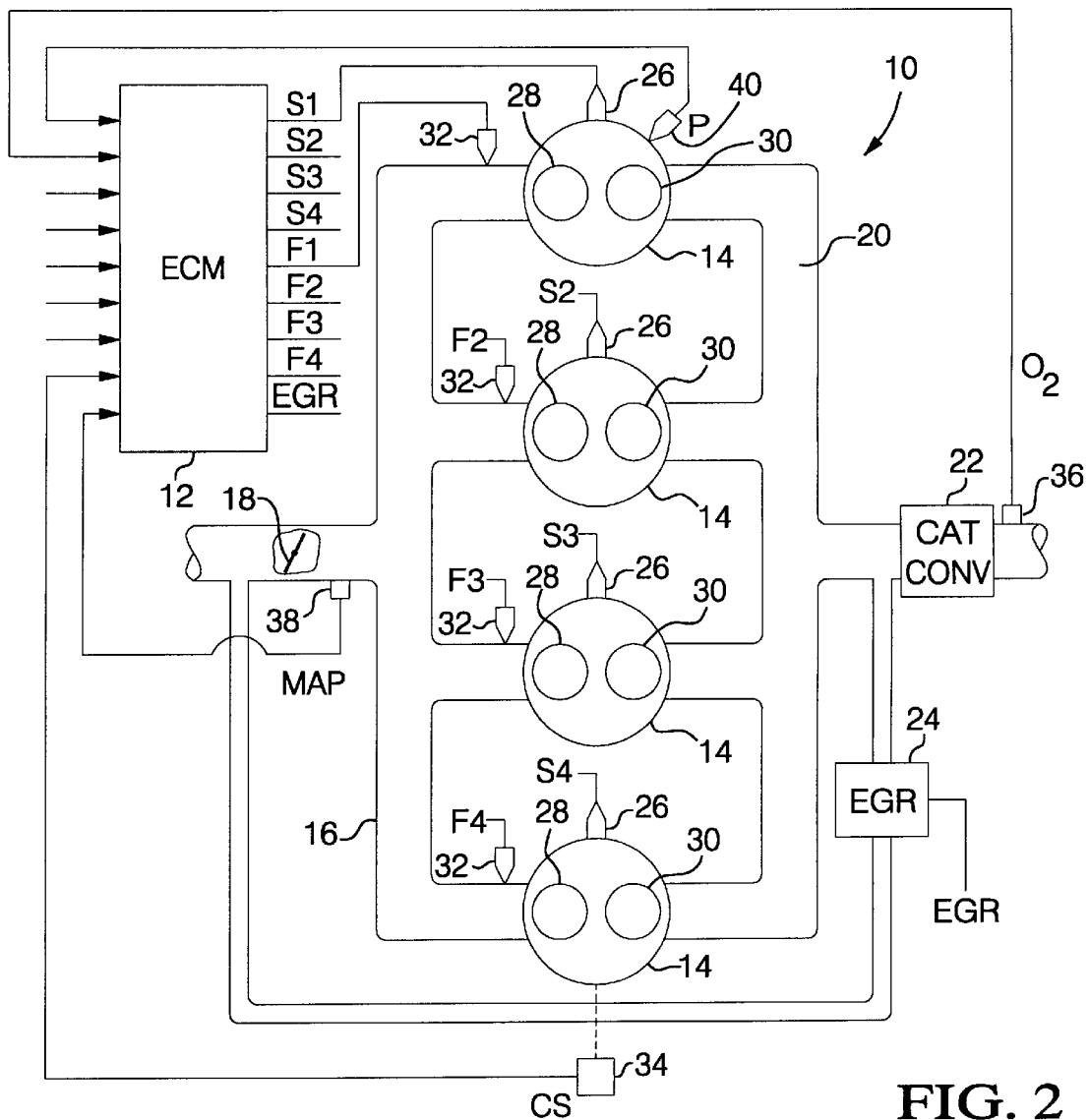
FIG. 2 is a diagram of a fuel volatility compensated engine control, including a microprocessor-based controller programmed according to this invention.

FIG. 2 depicts a motor vehicle internal combustion engine 10 and a microprocessor-based engine control module (ECM) 12. For purposes of illustration, the engine 10 is depicted as having four cylinders 14, an intake manifold 16 with throttle valve 18, and an exhaust manifold 20 with a three-way catalytic converter 22. An exhaust gas recirculation (EGR) valve 24 returns a portion of the exhaust gasses from the exhaust manifold 20 to the intake manifold 16. Each cylinder 14 is provided with a spark plug 26, an intake valve 28 coupled to the intake manifold 16, and an exhaust valve 30 coupled to the exhaust manifold 20. Fuel is delivered to the intake manifold 16 at each intake valve 28 by a respective fuel injector 32. Although not shown in FIG. 2, each cylinder 14 houses a piston which is mechanically coupled to a crankshaft, which in turn, provide motive power to the vehicle through a transmission and drivetrain.

Figure 1A:
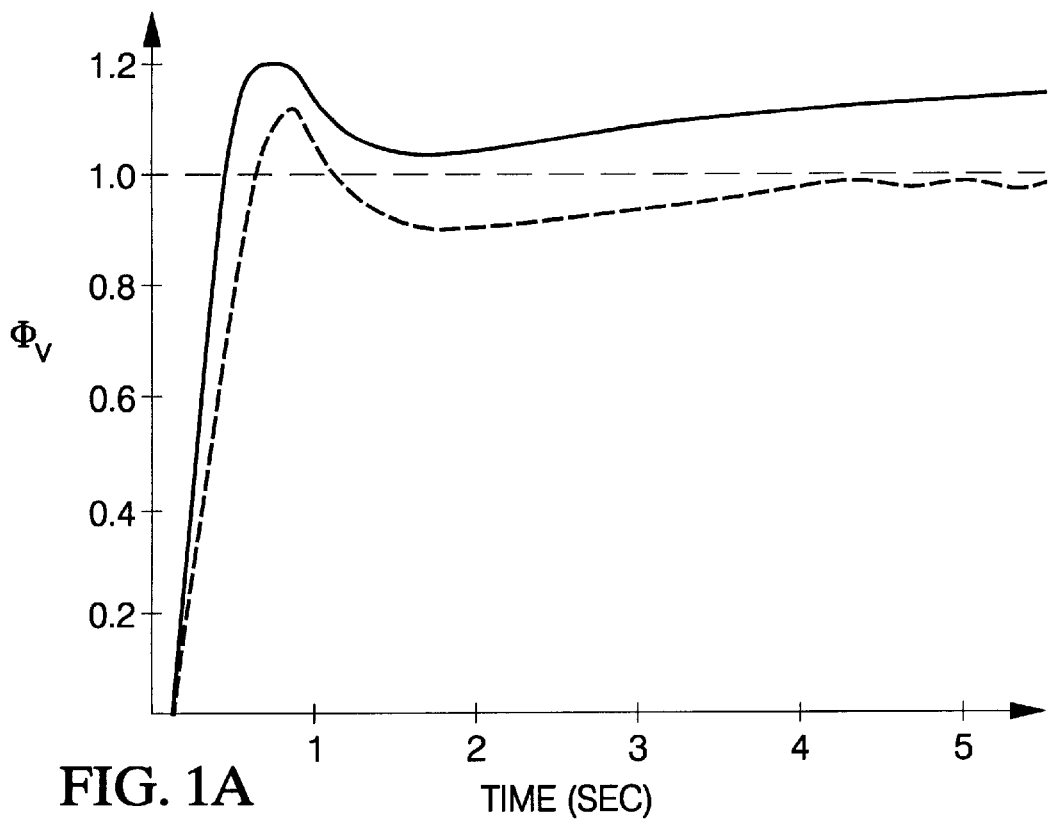
FIG. 1A is a graph depicting the fuel vapor-to-air equivalence ratio $\phi_v$ as a function of time for low and high volatility fuels during a cold start.

The ECM 12 receives a number of input signals representing various engine and ambient parameters, and generates control signals F1–F4 for the fuel injectors 32, S1–S4 for the spark plugs 26, and EGR for the EGR valve 24, all based on the input signals. Conventionally, the inputs include crankshaft (or camshaft) position as provided by a variable reluctance sensor 34, exhaust gas air/fuel ratio as provided by oxygen sensor 36, and intake manifold absolute pressure (MAP) as provided by pressure sensor 38. Other typical inputs include the manifold absolute temperature (MAT), ambient (barometric) pressure (BARO), fuel rail pressure (FRP), and mass air flow (MAF). For the most part, the control algorithms for generating the fuel and spark control signals are conventional and well known. For example, fuel may be supplied based on MAF, or by a speed-density algorithm, with closed-loop correction based on the feedback of oxygen sensor 36, and spark timing may be controlled relative to crankshaft position based on engine speed and throttle position. Under steady state and slow transient conditions, the closed-loop feedback allows the ECM 12 to reliably control the engine 10 to minimize emissions while maintaining performance and driveability. However, during engine warm-up and significant fueling, transients, the sensor 36 is unable to provide adequate feedback information, and the fuel vapor-to-air equivalence ratio $\phi_v$ deviates from the desired value (typically stoichiometric) due to variations in fuel volatility as discussed above in reference to FIG. 1A. Such variability can degrade both emission control and driveability, as also discussed above.

According to this invention, the ECM 12 detects variations in fuel volatility during engine warm-up and/or transient fueling conditions, and suitably adjusts the nominal control parameters to compensate for the detected variation.

Figure 1B:
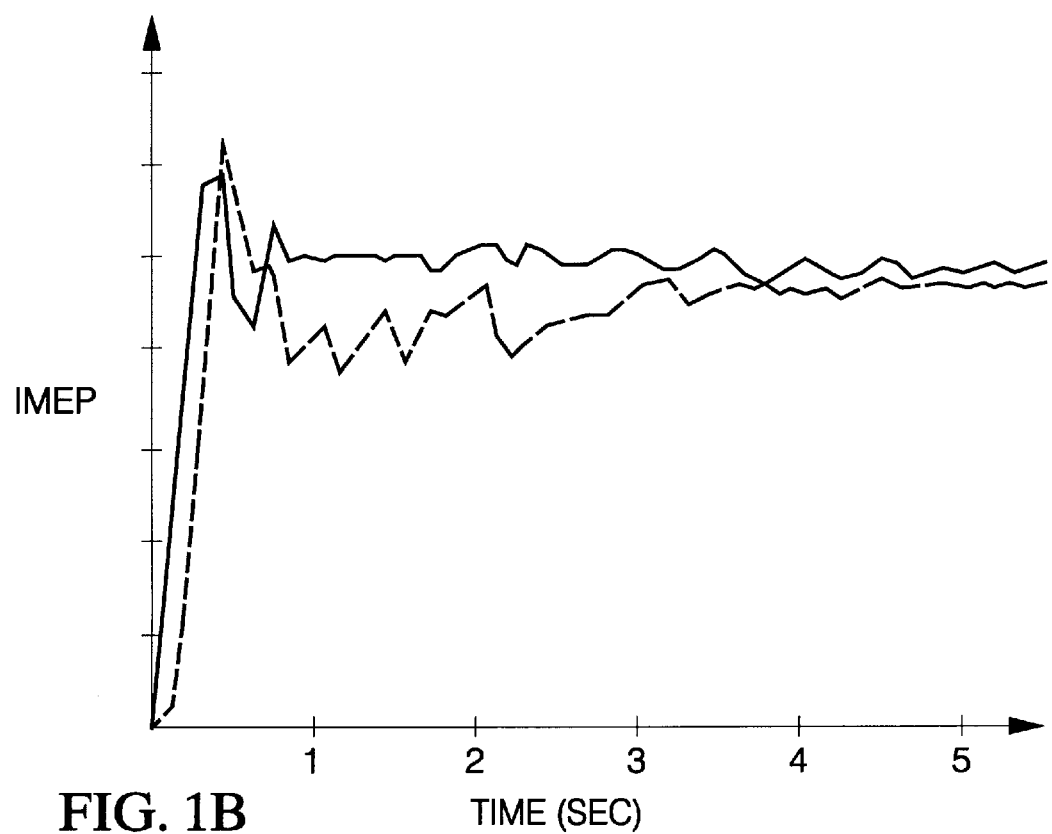
FIG. 1B is a graph depicting the indicated mean effective pressure (IMEP) as a function of time for low and high volatility fuels during a cold start.
Figure 3:
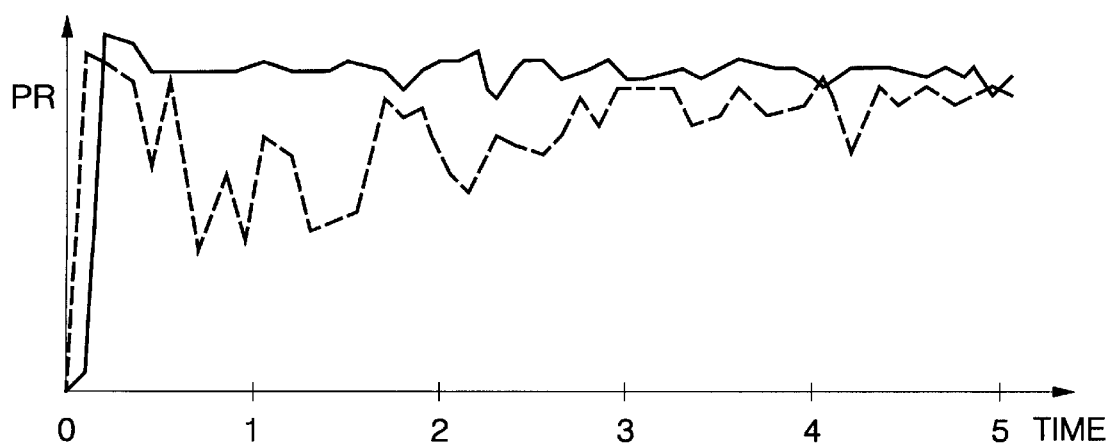
FIG. 3 shows the pressure ratio parameter for the high and low volatility fuels as in FIGS. 1A and 1B.

In general, this invention recognizes that the fuel volatility may be conveniently detected as a function of the fired-to-motored cylinder pressure ratio; that is, the ratio of the pressure occurring with and without combustion. The motored pressure is the pressure that would exist through the cycle if combustion did not occur. Its value can be estimated from a few samples of pressure during compression, using polytropic relations. The ECM 12 determines the pressure ratio with one or more cylinder pressure sensors 40 by forming a ratio of the sensed pressure in a given combustion cycle before and after heat from the combustion can significantly influence pressure. The ratio of fired-to-motored pressure is 1.0 before heat release by the flame, increases as heat is released and after the heat release process is over remains constant through expansion. FIG. 3 shows two pressure-ratio curves for cycles with different air-fuel ratios as produced by the high and low volatility fuels as depicted in FIG. 1. The difference between the pressure ratio at any point in the cycle and 1.0 is directly related to the fraction of fuel burned at that point. This value (PR parameter) at some point during expansion (for this example 55 cam degrees after piston top dead center) is found to directly correlate with the IMEP for the cycle (see FIG. 1B for the IMEP curves). For a given spark timing, leaner cycles caused by lower fuel volatility burn more slowly. The work lost because the burning did not occur early enough is reasonably estimated by the PR parameter, and it acts as a measure of the lateness of the burn. The relationship among the lateness of the burn, the cylinder air-fuel ratio and the fuel volatility provides the basis for volatility detection with this invention. A single pressure sensor 40 may be used as depicted in FIG. 2, or alternately, the pressure ratios obtained from sensors responsive to the pressure in two or more cylinders 14 may be averaged.

Figure 4:
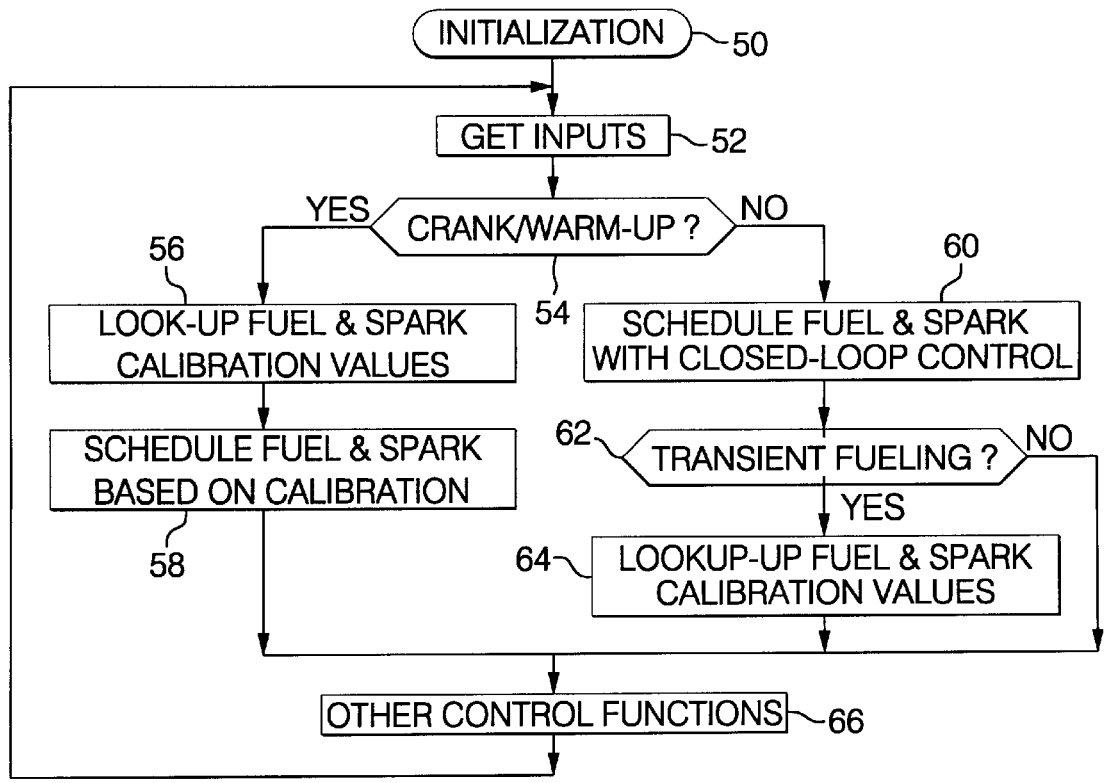
FIGS. 4–7 are flow diagrams representative of computer program instructions executed by the controller of FIG. 2 in carrying out the control of this invention.
Figure 5:
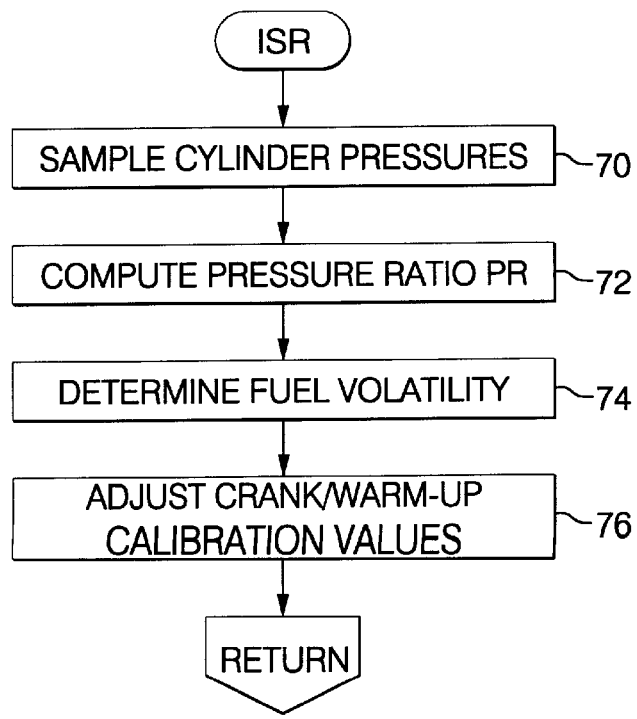

FIGS. 4–7 depict flow diagrams representative of computer program instructions executed by ECM 12 in carrying out the control of this invention. FIG. 4 is a main flow diagram. It primarily embodies both conventional fuel and spark algorithms, as discussed above, as well as the volatility compensation of this invention. FIG. 5 is an interrupt service routine for detecting fuel volatility and compensating the engine control parameters; and FIGS. 6–7 detail alternate implementations of the fuel volatility determination.

Referring to FIG. 4, the initialization block 50 is executed at the initiation of each period of engine operation to initialize various parameters and status flags to predetermined initial conditions. In the control of this invention, for example, this may include retrieving an estimated fuel volatility parameter determined in a previous period of engine operation. Following initialization, the block 52 is executed to read the various inputs mentioned above in respect to FIG. 2. If the engine 10 is in a crank or warm-up mode, as determined at block 54, the blocks 56 and 58 are executed to determine various open-loop fuel and spark control calibration values by table look-up, based on the determined fuel volatility, and to schedule the fuel and spark control signals F1–F4, S1–S4 based on the determined calibration values. As indicated above, the assumed fuel volatility is initially set to a predetermined value, and in subsequent periods of engine operation is initialized based on the volatility determined in the previous period of engine operation. Although the fuel volatility changes each time fuel is added to the fuel tank, the retrieved volatility parameter provides a fairly close approximation of the current volatility in most instances.

Once the engine 10 is no longer in the crank or warm-up modes, again as determined at block 54, the block 60 is executed to schedule the fuel and spark controls using a conventional closed-loop control strategy, as discussed above. If a transient fueling condition is in effect, as determined at block 62, the block 64 is additionally executed to adjust the scheduled fuel and spark controls to satisfy emission and driveability concerns. The fuel transient adjustments are essentially open-loop corrections to the closed-loop values, based on an assumed fuel volatility. As with the crank and warm-up control, the assumed fuel volatility is initially set to a predetermined value, and in subsequent periods of engine operation is initialized based on the volatility estimated in the previous period of engine operation.

The above-described operations are repeatedly executed along with other control functions (as indicated by the block 66) as in a purely conventional control. Meanwhile, typically in response to an interrupt signal based on crankshaft position, the ECM samples the output of pressure sensor 40 to determine the PR parameter and suitably adjust the fuel and spark control calibrations. Alternately, of course, the motored-to-fired pressure ratio may be determined. FIG. 5 depicts such an interrupt service routine (ISR) in which the cylinder pressures are read and the PR parameter is computed at blocks 70 and 72. The blocks 74 and 76 are then executed to estimate the fuel volatility as a function of the pressure ratio PR, and to suitably adjust the crank/warm-up and transient fueling calibration values used to schedule fuel and spark controls in blocks 58 and 64 of FIG. 4. During crank and warm-up, the fuel and spark retard controls are adjusted based on the determined fuel volatility to provide more aggressive spark retard and leaner fueling with higher volatility fuels for reduced emissions, faster heating of the catalytic converter 22, and improved warm-up driveability. During transient fueling, the fuel and spark retard controls are adjusted based on the determined fuel volatility to reduce the rich/lean air-fuel ratio excursions, thereby reducing emissions and improving driveability.

Figure 6:
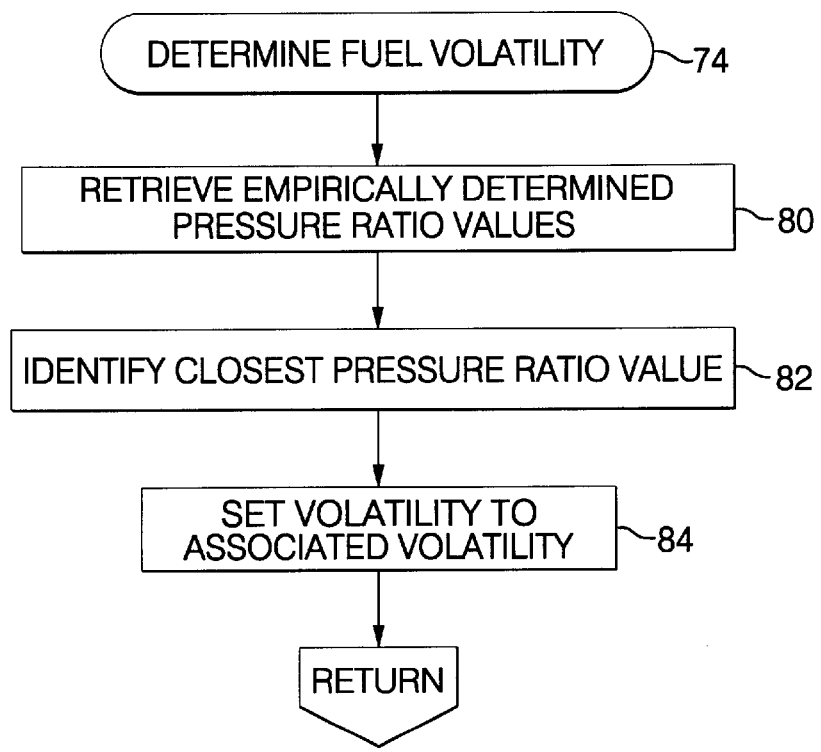
Figure 7:
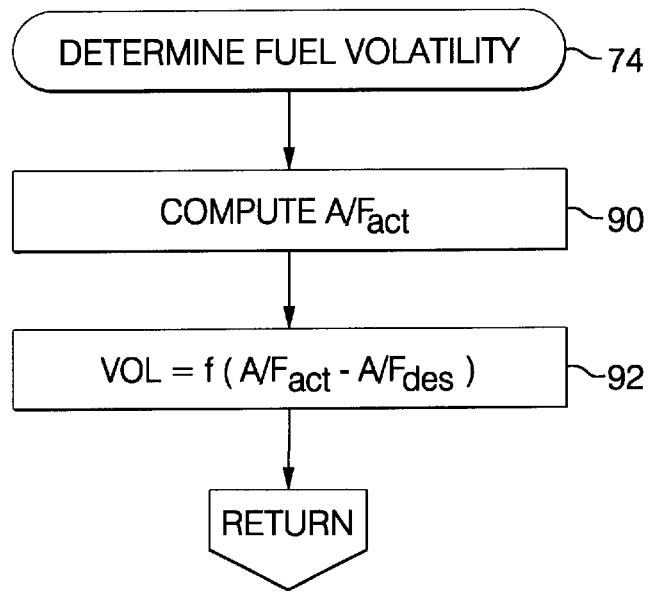

FIGS. 6 and 7 depict alternate mechanizations of the block 74 of FIG. 5. In the mechanization of FIG. 6, the ECM 12 stores a matrix of empirically determined pressure ratio values that occur with fuels of differing volatility. In this case, the block 80 retrieves the pressure ratio matrix, the block 82 identifies a pressure ratio from the matrix that corresponds with the pressure ratio determined at block 72, and the block 84 sets the estimated fuel volatility VOL to the value associated with the identified pressure ratio of the matrix. In the mechanization of FIG. 7, the ECM 12 computes the fuel vapor-to-air equivalence ratio $\phi_v$ (A/F$_{act}$), as indicated at block 90, and then determines the fuel volatility VOL as a function of the deviation between the computed ratio (A/F$_{act}$) and the desired fuel vapor-to-air equivalence ratio $\phi_v$ (A/F$_{des}$).

In summary, the control of this invention provides improved emission control and driveability, particularly during engine warm-up and transient fueling, by deducing the fuel volatility based on the measured pressure ratio PR, and then suitably adjusting the fuel and spark control parameters. Although described in reference to the illustrated embodiment, it will be appreciated that the present invention has much broader application and is not limited thereto. For example, the control may be used in connection with direct injection engines, engines having a different number of cylinders, multiple intake and/or exhaust valves per cylinder, multiple spark plugs per cylinder, and so on. Accordingly, controls incorporating these and other modifications may fall within the scope of this invention, which is defined by the appended claims.

What is claimed is:

1. A control method for a spark ignition internal combustion engine in which fuel delivery to an engine cylinder is determined based on an assumed fuel volatility, the control method comprising the steps of:

measuring fired and motored pressures in said cylinder during a combustion cycle, and determining a pressure ratio based on such measured pressures;

determining an actual volatility of the delivered fuel as a function of the determined pressure ratio; and adjusting the fuel delivery to said engine cylinder based on the determined actual volatility.

2. The control method of claim 1, including the steps of:

storing the actual fuel volatility determined in a first period of engine operation, and in a subsequent period of engine operation, retrieving the stored actual volatility and delivering fuel to the engine cylinder based on the retrieved volatility.

3. The control method of claim 1, wherein the step of determining an actual volatility of the delivered fuel comprises the steps of:

storing a matrix of empirically determined pressure ratios associated with various fuel volatilities;

identifying a stored pressure ratio that most closely corresponds to the determined pressure ratio; and determining the actual volatility based on the fuel volatility associated with the identified stored pressure ratio.

4. The control method of claim 1, wherein the fuel delivery is calibrated to achieve a desired fuel vapor-to-air equivalence ratio, and the step of determining an actual volatility of the delivered fuel comprises the steps of:

determining an actual fuel vapor-to-air equivalence ratio based on the determined pressure ratio; and determining the actual volatility of the delivered fuel based on a deviation of the actual fuel vapor-to-air equivalence ratio from the desired fuel vapor-to-air equivalence ratio.

5. A control method for a spark ignition internal combustion engine in which spark timing and fuel delivery to an engine cylinder during an engine warm-up period are determined based on an assumed fuel volatility, the control method comprising the steps of:

measuring fired and motored pressures in said cylinder during a combustion cycle of said warm-up period, and determining a pressure ratio based on such measured pressures;

determining an actual volatility of the delivered fuel as a function of the determined pressure ratio; and adjusting the spark timing and fuel delivery to said engine cylinder during said warm-up period based on the determined actual volatility.

6. A control method for a spark ignition internal combustion engine in which spark timing and fuel delivery to an engine cylinder are determined based on a measure of an fuel vapor-to-air ratio in an exhaust stream of the engine, the control method comprising the steps of:

identifying a period of transient fuel delivery;

measuring fired and motored pressures in said cylinder during a combustion cycle of said identified period, and determining a pressure ratio based on such measured pressures;

determining an actual volatility of the delivered fuel as a function of the determined pressure ratio; and adjusting the spark timing and fuel delivery to said engine cylinder during said identified period based on the determined actual volatility.

* * * * *